United States Patent
Lee et al.

(10) Patent No.: US 10,381,813 B2
(45) Date of Patent: Aug. 13, 2019

(54) SIGNAL TRANSMISSION DEVICE FOR AIR CONDITIONER

(71) Applicant: LG ELECTRONICS INC., Seoul (KR)

(72) Inventors: Kwonhyung Lee, Seoul (KR); Juntae Kim, Seoul (KR); Chisun Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 114 days.

(21) Appl. No.: 15/031,971

(22) PCT Filed: Sep. 16, 2014

(86) PCT No.: PCT/KR2014/008619
§ 371 (c)(1),
(2) Date: Apr. 25, 2016

(87) PCT Pub. No.: WO2015/068946
PCT Pub. Date: May 14, 2015

(65) Prior Publication Data
US 2016/0273796 A1 Sep. 22, 2016

(30) Foreign Application Priority Data
Nov. 11, 2013 (KR) .................. 10-2013-0136464

(51) Int. Cl.
*H02G 3/04* (2006.01)
*F24F 1/26* (2011.01)
(Continued)

(52) U.S. Cl.
CPC ............. *H02G 3/0462* (2013.01); *F24F 1/26* (2013.01); *F24F 1/32* (2013.01); *F24F 11/89* (2018.01); *F24F 13/20* (2013.01); *F24F 11/56* (2018.01)

(58) Field of Classification Search
CPC .. H02G 3/0462; F24F 1/32; F24F 1/34; F24F 1/26; F24F 11/0009; F24F 11/0086;
(Continued)

(56) References Cited

U.S. PATENT DOCUMENTS 202,047 A * 4/1878 Phillips .................. F16L 11/127
174/47
2,530,105 A * 11/1950 Wallace, Jr. ............ H01B 7/045
174/47

(Continued)

FOREIGN PATENT DOCUMENTS

EP   1 318 355 A1   6/2003
EP   2 369 247 A2   9/2011
(Continued)

OTHER PUBLICATIONS

"Winding" from Collins English Dictionary. 2014. Accessed Sep. 2017.*

(Continued)

*Primary Examiner* — Jianying C Atkisson
*Assistant Examiner* — Tavia Sullens
(74) *Attorney, Agent, or Firm* — Dentons US LLP

(57) ABSTRACT

A communication device for pipes of an air conditioner disclosed herein transmits and receives communication signals using induced electromagnetic force, generated by a signal line wound around a core assembly, thereby facilitating for coupling between the core assembly and the signal line. Also, one type of core assembly can be commonly applied to various standards of pipes. Rainwater or foreign materials cannot permeate between the signal line and the core assembly by winding the signal line on the core assembly, despite of external installation, thus preventing breakdown or degraded communication performance of the communication device. Also, with forming a signal line
(Continued)

mounting hole through the core assembly, the signal line is fixedly inserted through the signal line mounting hole, thereby preventing in advance a movement of the core assembly even though a refrigerant pipe vibrates.

4 Claims, 3 Drawing Sheets

(51) Int. Cl.
  *F24F 1/32*  (2011.01)
  *F24F 13/20* (2006.01)
  *F24F 11/89* (2018.01)
  *F24F 11/56* (2018.01)

(58) Field of Classification Search
  CPC .... F24F 11/02; F24F 13/20; F24F 2011/0068; F24F 2013/207; F25B 49/00; F25B 2600/07
  USPC ........ 174/47, 15.6, 19, 21, 68.1, 68.3, 72 A, 174/73.1, 74 R
  See application file for complete search history.

(56) References Cited

U.S. PATENT DOCUMENTS

| | | | | |
|---|---|---|---|---|
| 3,111,551 | A | * | 11/1963 | D Ascoli ................. H01B 7/29 174/15.6 |
| 3,277,231 | A | * | 10/1966 | Downey .............. H01B 7/0072 174/47 |
| 2008/0032621 | A1 | | 2/2008 | Higuma et al. |
| 2010/0065245 | A1 | | 3/2010 | Imada et al. |
| 2011/0219795 | A1 | | 9/2011 | Ahn et al. |

FOREIGN PATENT DOCUMENTS

| | | | |
|---|---|---|---|
| JP | 06081996 A | * | 3/1994 |
| KR | 20-2010-005295 U | | 5/2010 |
| KR | 10-2011-0019233 A | | 2/2011 |
| KR | 10-2011-0102032 A | | 9/2011 |
| KR | 10-1088039 B2 | | 11/2011 |
| WO | 2012/099362 A2 | | 7/2012 |

OTHER PUBLICATIONS

"Winding" from the Penguin English Dictionary. 2003. Accessed Sep. 2017.*

* cited by examiner

[Fig. 1] PRIOR ART
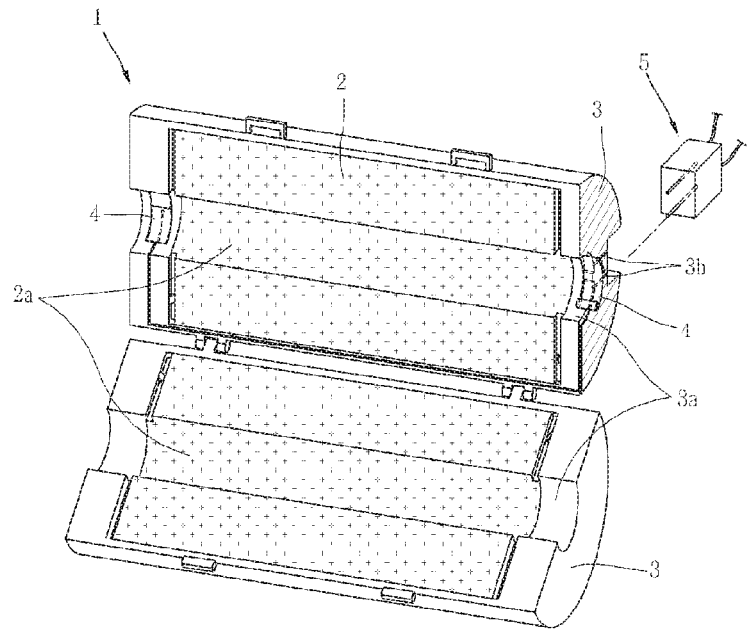
[Fig. 2] PRIOR ART
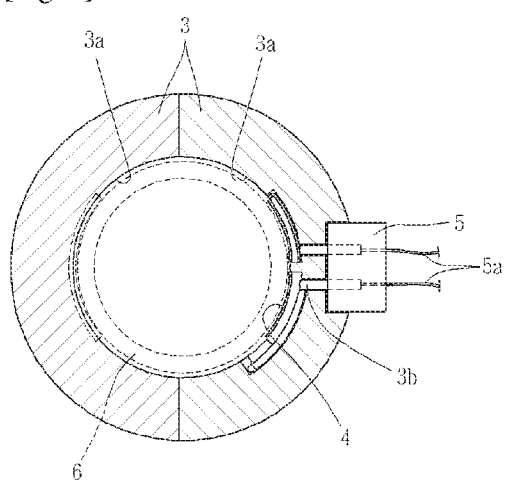
[Fig. 3]
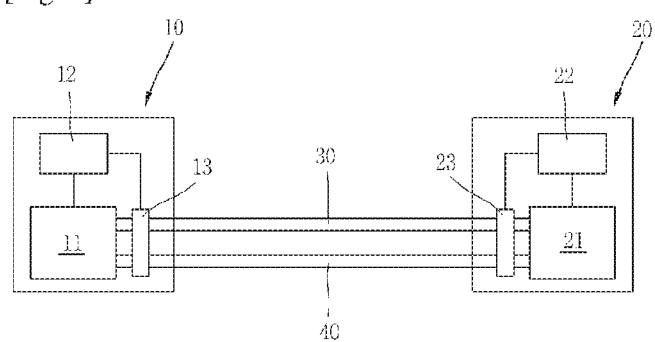

[Fig. 4]
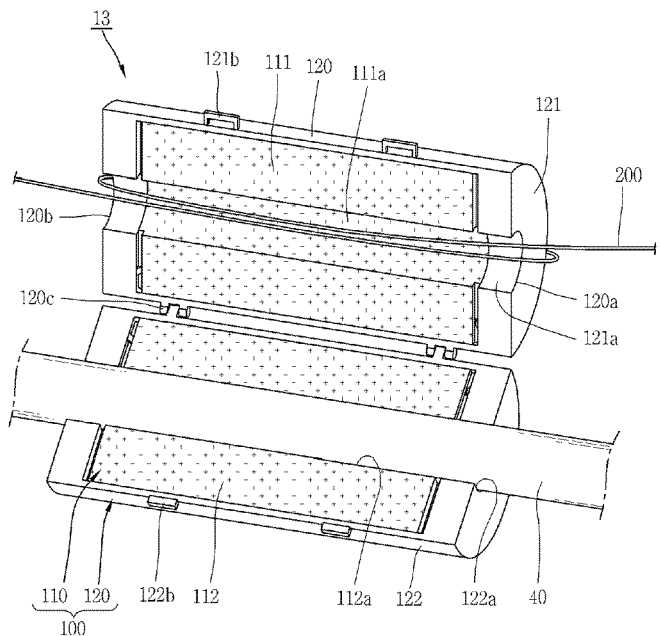
[Fig. 5]
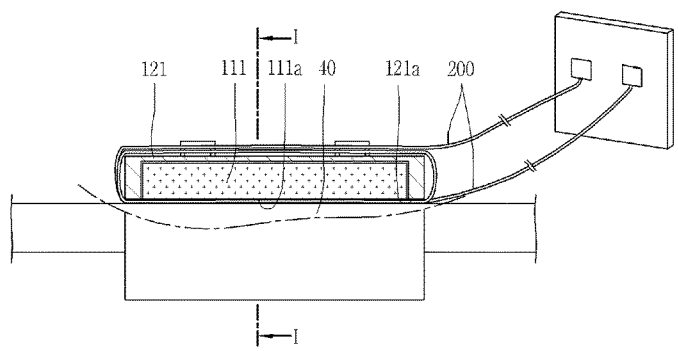
[Fig. 6]
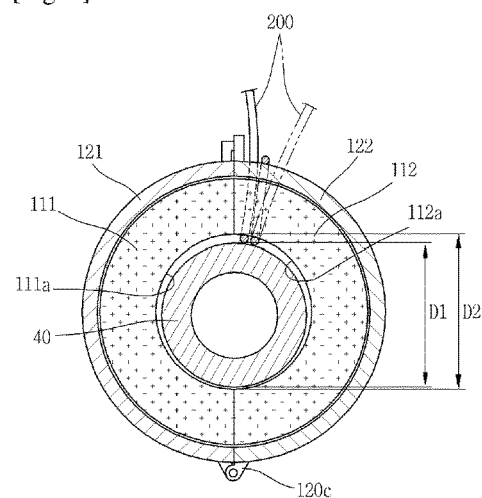

[Fig. 7]
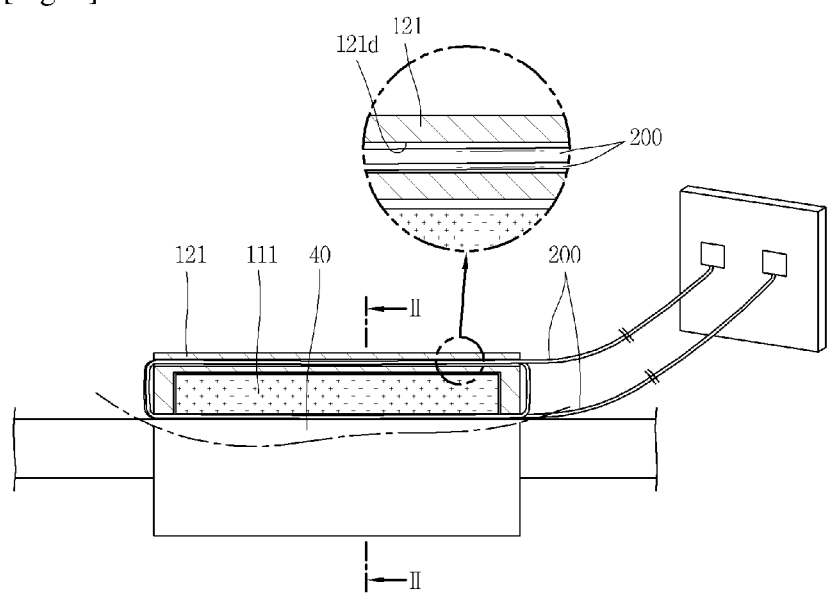
[Fig. 8]
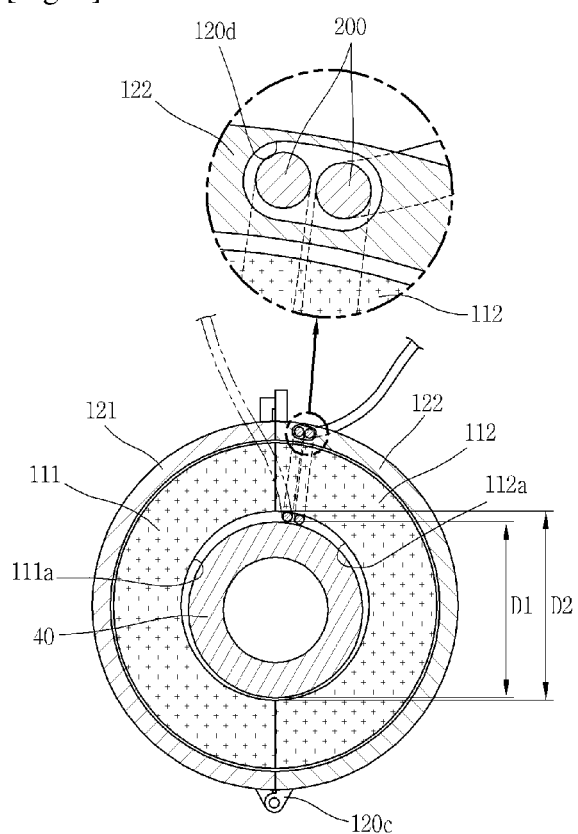

mance. The core assembly is typically configured such that
SIGNAL TRANSMISSION DEVICE FOR AIR CONDITIONER This application is a National Stage Entry of International Application No. PCT/KR2014/008619, filed Sep. 16, 2014, and claims the benefit of Korean Application No. 10-2013-0136464, filed on Nov. 11, 2013, all of which are hereby incorporated by reference in their entirety for all purposes as if fully set forth herein.

TECHNICAL FIELD

The present disclosure relates to a communication device for pipes (or a signal transmission device) of an air conditioner, capable of transferring signals using pipes between indoor units and an outdoor unit.

BACKGROUND ART

In general, an air conditioner is provided with an indoor unit and an outdoor unit, which are electrically connected such that electric signals can be transferred to each other. However, in case where a plurality of indoor units are connected in parallel to one outdoor unit or a refrigerant pipe is installed in a wall of a building and a plurality of indoor units are connected in parallel to the refrigerant pipe, it is usually difficult to electrically connect each of indoor units to outdoor units, number of which is less than the number of indoor units.

Accordingly, a communication technology for pipes is being currently introduced to allow electric signals to be transmitted and received using a refrigerant pipe, as a communication medium, which connects a plurality of indoor units to a less number of outdoor units. For example, a communication device for pipes may be configured such that both ends of a gas-side refrigerant pipe (hereinafter, referred to as 'gas pipe' and both ends of a liquid-side refrigerant pipe (hereinafter, referred to as 'liquid pipe' are connected to indoor units and an outdoor unit, respectively, in an insulating manner, and signal lines which are connected to a control board of the indoor units and a control board of the outdoor unit are connected to the gas pipe and the liquid pipe. Consequently, the gas pipe and the liquid pipe can be used as communication media between the indoor units and the outdoor unit.

Here, the refrigerant pipe is provided with a core assembly which is installed to increase communication performance. The core assembly is typically configured such that a pair of cores each having a semicircular section is accommodated in core holders and coupled to surround a refrigerant pipe, and the core holders are coupled to signal terminals which electrically connect the refrigerant pipe to each control board to each other. The signal terminals are fixed or detachably coupled to the core holders in a contact state with the refrigerant pipe.

FIG. 1 is a perspective view illustrating one example of the related art core assembly, and FIG. 2 is a sectional view illustrating a state that the core assembly of FIG. 1 is coupled to a pipe. As illustrated in FIGS. 1 and 2, the related art core assembly 1 includes cores 2 each provided with a pipe insertion recess 2a at a center thereof and having a semicircular sectional shape, core holders 3 each having a semicircular sectional shape and provided with a pipe insertion recess 3a, in which the corresponding core 2 is inserted, signal terminals 4 closely coupled onto both ends of an inner circumferential surface of one of the core holders 3, respectively, and a terminal pin 3b provided on one end of an outer circumferential surface of the one of the core holder 3 and allowing a connection with a connector 5, which is connected to each control board (not illustrated) via signal lines 5a.

In the core assembly 1 according to the related art, the core holders 3 are coupled to a gas pipe or a liquid pipe 6 (hereinafter, the gas pipe and the liquid pipe are collectively referred to as a refrigerant pipe and a reference numeral representatively denotes the liquid pipe) in a manner of surrounding the refrigerant pipe 6, such that the signal terminals 4 are closely adhered between an inner circumferential surface of each core holder 3 and an outer circumferential surface of the refrigerant pipe 6.

The terminal pin 3b is provided at the one of the core holder 3, and an inner end of the terminal pin 3b is connected to the signal terminal 4. An outer end of the terminal pin 3b is electrically connected to the connector 5 which is inserted into the terminal pin 3b for connection. Accordingly, the signal terminal 4 coupled to the core assembly 1 and the signal line 5a extending from each control board are electrically connected to each other, such that electric signals between the control boards are transferred to the refrigerant pipe 6.

DISCLOSURE OF INVENTION

Technical Problem

In the related art core assembly, the electric signal can be smoothly transferred only when the signal terminal 4 keeps on contacted by the refrigerant pipe 6. However, an assembly error of the core assembly 1, deterioration of the pipe or vibration causes the signal terminal 4 to be completely separated or intermittently spaced from the refrigerant pipe 6, which results in a non-smooth signal transmission.

Also, the outdoor unit of the air conditioner is usually installed at an outside of a building. Accordingly, when the signal line 5a and the signal terminal 4 are connected to the terminal pin 3b, the connector 5 and the like, a breakdown or degradation of communication performance of the communication device is likely to be caused due to permeation of rainwater or foreign materials between the terminal pin 3b and the connector 5.

Solution to Problem

Therefore, an aspect of the detailed description is to provide a communication device for pipes, which is capable of maintaining high communication performance even without a direct contact between a signal terminal and a refrigerant pipe, and an air conditioner having the same.

Another aspect of the detailed description is to provide a communication device for pipes, which is capable of preventing beforehand a breakdown or degradation of performance, caused due to rainwater or foreign materials even if being installed at an outside of a building, and an air conditioner having the same.

To achieve these and other advantages and in accordance with the purpose of the present invention, as embodied and broadly described herein, there is provided a communication device for pipes of an air conditioner, the device including a refrigerant pipe connecting an outdoor unit and an indoor unit to each other, a core assembly coupled to the refrigerant pipe in a surrounding manner, and a signal line that is configured to transfer electric signals transmitted and received through the refrigerant pipe to controllers controlling the outdoor unit and the indoor unit, respectively, wherein the signal line is inserted between the outer circumferential surface of the refrigerant pipe and an inner circumferential surface of the core assembly and electrically connected to the controllers.

Here, the core assembly may have an annular sectional shape with both ends open, and the signal line may be inserted through the core assembly from one side opening end to the other side opening end.

The signal line may be wound by at least once on inner and outer circumferential surfaces of the core assembly.

The core assembly may be provided with at least one through hole formed along a lengthwise direction thereof.

The signal line may be wound by passing through the inner circumferential surface of the core assembly and the through hole.

The core assembly may have a core made of a magnetic material, and an inner circumferential surface of the core may face an outer circumferential surface of the refrigerant pipe. Also, the signal line may be located between the inner circumferential surface of the core and the outer circumferential surface of the refrigerant pipe.

The core may have both side surfaces and an outer circumferential surface surrounded by a core holder made of an insulating material, and the core holder may be provided with a signal line mounting hole formed therethrough along a lengthwise direction thereof such that the signal line is inserted through the signal line mounting hole.

The signal line mounting hole may be formed through each of outer and inner portions of the core holder based on the core.

To achieve those aspect of the present disclosure, there is provided a communication device for pipes of an air conditioner, the device including a refrigerant pipe connecting an outdoor unit and an indoor unit to each other, a core assembly having an annular sectional shape with both ends open so as to be inserted into the refrigerant pipe for coupling, and provided with a pipe insertion recess formed on an inner circumferential surface thereof, wherein the core assembly has a core made of a magnetic material, controllers that are configured to control the outdoor unit and the indoor unit, respectively, by receiving electric signals transmitted and received through the refrigerant pipe, and a signal line that is configured to transfer the electric signals transferred through the refrigerant pipe to the controllers, wherein the signal line is electrically connected to the controllers by extending through an inner circumferential surface of the core assembly.

The core assembly may have an annular sectional shape with both ends open, and the signal line may be inserted through the core assembly from one side opening end to the other side opening end.

An inner diameter of the pipe insertion recess may be greater than an outer diameter of the refrigerant pipe.

An inner circumferential surface of the core may face an outer circumferential surface of the refrigerant pipe, and the signal line may be inserted between the inner circumferential surface of the core and the outer circumferential surface of the refrigerant pipe.

The core may have both side surfaces and an outer circumferential surface surrounded by a core holder made of an insulating material, and the core holder is provided with a signal line mounting hole formed therethrough along a lengthwise direction thereof such that the signal line is inserted through the signal line mounting hole.

Advantageous Effects of Invention

A communication device for pipes of an air conditioner may transmit and receive communication signals using induced electromotive force, which is generated by winding a signal line around a core assembly. This may facilitate for connection between the core assembly and the signal line, without the need of a direct contact between a signal terminal and a refrigerant pipe. In addition, as an inner diameter of a pipe insertion recess of the core assembly is greater than an outer diameter of a refrigerant pipe, one type of core assembly can be commonly applied to various standards of refrigerant pipes.

Also, even if the communication device is installed at the outside of a building, the connection between the signal line and the core assembly in the winding manner may prevent rainwater or foreign materials from permeating between the signal line and the core assembly, and accordingly prevent in advance a breakdown or degradation of communication performance due to the permeation.

In addition, the signal line may be fixedly inserted through a signal line mounting hole, which is formed through the core assembly, thereby preventing in advance a movement of the core assembly even though the refrigerant pipe vibrates.

BRIEF DESCRIPTION OF DRAWINGS

FIG. 1 is a perspective view illustrating one example of the related art core assembly.

FIG. 2 is a sectional view illustrating a state that the core assembly of FIG. 1 is coupled to a pipe.

FIG. 3 is a block diagram illustrating one exemplary embodiment of an air conditioner having a communication device for pipes in accordance with the present disclosure.

FIG. 4 is a perspective view illustrating one exemplary embodiment of a core assembly of a signal transfer unit provided in an outdoor unit of the air conditioner illustrated in FIG. 3.

FIG. 5 is a front view illustrating a state that the core assembly illustrated in FIG. 4 is coupled to a pipe.

FIG. 6 is a sectional view taken along the line 'I-I' of FIG. 5.

FIG. 7 is a perspective view illustrating another exemplary embedment of a core holder illustrated in FIG. 4.

FIG. 8 is a sectional view taken along the line 'II-II' in a state that the core holder illustrated in FIG. 7 is mounted to a liquid pipe.

BEST MODE FOR CARRYING OUT THE INVENTION

Hereinafter, description will be given of a communication device for pipes (or a signal transmission device) of an air conditioner in accordance with one exemplary embodiment disclosed herein with reference to the accompanying drawings.

FIG. 3 is a block diagram illustrating one exemplary embodiment of an air conditioner having a communication device for pipes in accordance with the present disclosure.

As illustrated in FIG. 3, an air conditioner according to one exemplary embodiment may include an outdoor unit 10 and an indoor unit 20. The outdoor unit 10 and the indoor unit 20 may be located with interposing an outer wall of a building therebetween, and connected to each other through a gas pipe 30 and a liquid pipe 40.

The outdoor unit 10 may include, within a case thereof, an outdoor unit-side heat exchanging unit 11, an outdoor unit-side controller 12, and an outdoor unit-side signal transfer unit 13. The indoor unit 20 may include, within a case thereof, an indoor unit-side heat exchanging unit 21, an indoor unit-side controller 22, and an indoor unit-side signal transfer unit 23.

Here, the outdoor unit-side controller 12 and the indoor unit-side controller 22 may exchange control signals through the medium of an alternating current (AC) signal. For example, an AC control signal which is output from the outdoor unit-side controller 12 may be transmitted to the indoor unit-side controller 22 through the gas pipe 30 or the liquid pipe 40 or both of the pipes 30 and 40 via the outdoor unit-side signal transfer unit 13. On the other hand, an AC control signal which is output from the indoor unit-side controller 22 may be transmitted to the outdoor unit-side controller 12 through the gas pipe 30 or the liquid pipe 40 or both of the pipes 30 and 40 via the indoor unit-side signal transfer unit 23.

FIG. 4 is a perspective view illustrating one exemplary embodiment of a core assembly of a signal transfer unit provided in an outdoor unit of the air conditioner illustrated in FIG. 3, FIG. 5 is a front view illustrating a state that the core assembly illustrated in FIG. 4 is coupled to a pipe, and FIG. 6 is a sectional view taken along the line 'I-I' of FIG. 5. Hereinafter, the outdoor unit-side signal transfer unit installed in the liquid pipe will be representatively described.

As illustrated in FIG. 4, the signal transfer unit 13 according to this exemplary embodiment may include a core assembly 100 coupled to surround the liquid pipe 40, and a signal line 200 wound around the core assembly 100 and having both ends connected to the outdoor unit-side controller 12.

The core assembly 100 may include a core 110 made of a magnetic material and surrounding the liquid pipe 40, and a core holder 120 accommodating the core 110 therein such that the core 110 keeps on surrounding the liquid pipe 40 and simultaneously the signal line 200 is located between the liquid pipe 40 and the core 110.

The core 110 may be implemented with a pair of partial cores 111 and 112 each of which is made of a magnetic material to generate single turn winding inductance and has a semicircular sectional shape. However, the shape of the core 110 may be formed to have various sectional shapes, such as a ¼ circular sectional shape, as well as the semicircular sectional shape.

The core 110 may be implemented as a troidal core. For example, a troidal core which has an inner radius R1, an outer radius R2, a height h, and magnetic permeability μ, has a self inductance L of $L=(\mu h/2\pi) \ln(R2/R1)$ and an impedance of $Z=j2\pi fL$ with respect to an AC signal of a frequency f. Therefore, with respect to an AC control signal transmitted by the outdoor unit-side controller 12, a transmission line terminated with an impedance of 2*Z is formed at the side of the outdoor unit-side heat exchanging unit 11 by an operation of the core through which the liquid pipe 40 penetrates. Therefore, when an AC signal flows along the liquid pipe 40 installed between the outdoor unit 10 and the indoor unit 20, the AC signal exhibits an attenuation characteristic according to a distance due to a transmission line impedance $Z_0$ of the pipe itself. And, the transmission line impedance $Z_0$ is proportional to the distance, and an AC signal which is used for sensing a distance of the liquid pipe 40 has reduced signal strength by the transmission line impedance $Z_0$ and the signal transfer unit 13. That is, if the impedance value of the signal transfer unit 13 and strength of AC control signals of transmitting and receiving ends are known, distance information may be obtained. Accordingly, the liquid pipe may be used as a transmission path of a distance sensing signal and this may allow for automatic calculation of a piping distance between the indoor unit and the outdoor unit, which is used for calculating an amount of refrigerant.

The core holder 120 may also have a semicircular sectional shape, similar to the core 110. The core holder 120 may be divided into two parts along a center axis of a lengthwise direction thereof, so as to be formed with a plurality of partial holders 121 and 122 which are assembled into a cylindrical shape with accommodating the core 110 therebetween. The pair of partial holders 121 and 122 may be coupled by hinges at one side thereof in a widthwise direction so as to be rotatable with respect to each other. On the other hand, the pair of partial holders 121 and 122 may be provided with a plurality of coupling grooves 121b and a plurality of coupling protrusions 122b at the other side thereof, respectively, such that the pair of partial holders 121 and 122 can be detachably coupled to each other. However, the core may be integrally molded with the core holder.

Here, the core 110 and the core holder 120 may be provided with pipe insertion recesses 111a, 112a, 121a and 122a formed at a center thereof to surround the liquid pipe 40. An inner diameter D2 of the pipe insertion recesses 111a and 112a may be formed greater than an outer diameter D1 of the liquid pipe 40, so as to be commonly applied to various standards of pipes. Here, in order to prevent the core assembly 100 from freely spinning with respect to the liquid pipe 40, an elastic member (not illustrated) for supporting the core assembly 100 onto the liquid pipe 40 may be installed between an inner circumferential surface of the core assembly 100 (namely, the pipe insertion recesses) and an outer circumferential surface of the liquid pipe 40. The elastic member may be installed with a predetermined gap from along an inner circumferential surface of the core assembly such that a center of the elastic member and a center of the core assembly are aligned with each other. Or, the elastic member may be installed eccentric to one side of the inner circumferential surface of the core assembly such that the center of the elastic member is eccentric from the center of the core assembly.

Meanwhile, the core holder 120 may be wound by the signal line 200, without a separate signal terminal for electrical connection between the liquid pipe 40 and the signal line 200. For example, the signal line 200 may be inserted from one side opening end 120a of the core holder 120, extend along an inner circumferential surface of the pipe insertion recesses 121a and 122a and then drawn out through the other opening end 120b, such that both ends thereof are electrically connected to the outdoor unit-side controller 12.

Instead of the connection between the signal line 200 and the outdoor unit-side controller 12 in a manner of inserting the signal line 200 into the one side opening end 120a of the core holder 120, extending it through the pipe insertion recesses 121a and 122a and drawing it out through the other opening end 120b, in order to stably maintain the position of the signal line 200 and simultaneously increase induced electromotive force, the signal line 200 may also preferably be connected to the outdoor unit-side controller 12 after both ends thereof intersect with each other within the pipe insertion recesses 111a, 112a, 121a and 122a in a shape of turning the core holder 120 more than once from the outer circumferential surface to the inner circumferential surface of the core holder 120.

A non-explained reference numeral 120c denotes a hinge.

Hereinafter, description will be given of operation effects of the communication device for pipes and the air conditioner according to the exemplary embodiments.

That is, while the partial holders 121 and 122 are open to both sides thereof based on the hinges 120c of the core holder 120, the pipe insertion recess 112a of the one partial core 112 and the pipe insertion recess 122a of the one partial holder 122 are inserted to be aligned with the liquid pipe 40.

Then, after winding the signal line 200 in a lengthwise direction of the core holder 120 along the pipe insertion recesses 111a and 121a of the other partial core 111 and partial holder 121, the partial core 111 and the partial holder 121 are rotated toward the other partial core 112 and the partial holder 122, and the coupling protrusions 122b of the other partial holder 122 are inserted into the coupling grooves 121b of the one partial holder 121 in an aligning manner.

A communication signal of the outdoor unit-side controller 12 which is applied through the signal line 200 coupled to the core assembly 100 may be transmitted to the liquid pipe 40 using the induced electromotive force of the magnetic core 110 (the Lenz's law), and a communication signal which is applied from the indoor unit-side controller 22 to the liquid pipe 40 may be induced on the signal line 200 to be received by the outdoor unit-side controller 12.

In this manner, as the signal line is coupled to the core assembly in a non-contact manner other than a contact manner, the connection between the core assembly and the signal line may be facilitated. In addition, the inner diameter of the pipe insertion recess of the core assembly may be formed greater than the outer diameter of the liquid pipe. This may allow one type of core assembly to be commonly applied to various standards of liquid pipes.

Also, the coupling between the signal line and the core assembly in the winding manner may prevent rainwater or foreign materials from permeating between the signal line and the core assembly even if a device, such as the outdoor unit, is installed at the outside of a building, accordingly minimizing a breakdown or degradation of communication performance of the communication device for pipes, which may be caused due to the permeation.

Hereinafter, description will be given of another exemplary embodiment of a core holder wound with a signal line in a communication device for pipes according to the present disclosure. FIG. 7 is a perspective view illustrating another exemplary embedment of the core holder illustrated in FIG. 4. FIG. 8 is a sectional view taken along the line II-II in a state that the core holder illustrated in FIG. 7 is mounted to a liquid pipe.

That is, the foregoing embodiment has illustrated that the signal line is wound on the core holder after being inserted through the pipe insertion recesses, but this embodiment illustrates that a signal line mounting hole is formed through the core holder in a lengthwise direction of the core holder such that the signal line can be firmly, stably coupled to the core holder by being wound on the core holder.

For example, referring to FIGS. 7 and 8, the core holder 120 according to this exemplary embodiment may be provided with at least one signal line mounting hole 121d formed through each of an inner portion and an outer portion of the core holder 120 based on the core 110. The signal line 200 may be inserted into the signal line mounting hole 120d and firmly fixed thereto.

The signal line mounting hole 120d, as illustrated in FIG. 8, may be formed in an arcuate shape such that the signal line can be wound therealong by plural times. In some cases, a plurality of signal line mounting holes may be formed along a circumferential direction of the core holder 120, such that one string of signal line is inserted into each hole.

A configuration and operation effects of the core assembly according to this exemplary embodiment are the same or similar to those of the foregoing embodiment, so detailed description thereof will be omitted. Here, in this exemplary embodiment, the signal line may be inserted into the signal line mounting hole and firmly wound therealong, which may prevent the core assembly from moving even if a refrigerant pipe vibrates.

Meanwhile, although not illustrated, a signal line mounting recess having a predetermined depth may also be formed in a thickness direction of the core holder along outer and inner circumferential surfaces of the core holder, instead of the signal line mounting hole. In this structure, the signal line may be inserted into the signal line mounting recess so as to be fixed stably and firmly.

The invention claimed is:

1. A communication device for pipes of an air conditioner, the device comprising:
   a refrigerant pipe connecting an outdoor unit and an indoor unit to each other, the refrigerant pipe having an outer circumferential surface;
   a core assembly having a pipe insertion recess formed therein to accommodate the refrigerant pipe, the core assembly comprising a core and a core holder, the core made of a magnetic material and having an inner circumferential surface and an outer circumferential surface such that the inner circumferential surface of the core is facing an outer circumferential surface of the refrigerant pipe, and the core holder made of an insulating material and surrounding the outer circumferential surface of the core; and
   a signal line that is configured to transfer electric signals transmitted and received through the refrigerant pipe to an outdoor unit controller controlling the outdoor unit and an indoor unit controller controlling the indoor unit, respectively,
   wherein the core and the core holder are each formed with the pipe insertion recess,
   wherein the signal line is located between the outer circumferential surface of the refrigerant pipe and an inner circumferential surface of the core assembly along a lengthwise direction of the core assembly and is electrically connected to the outdoor unit controller and the indoor unit controller,
   wherein the core assembly has an annular sectional shape with a first side open end and a second side open end,
   wherein the signal line extends through the core assembly from the first side open end to the second side open end along the lengthwise direction of the core assembly, and
   wherein the signal line wraps at least once on the inner circumferential surface of the core assembly and an outer circumferential surface of the core assembly along the lengthwise direction of the core assembly,
   wherein the inner circumferential surface of the core assembly comprises the inner circumferential surface of the core and the core holder.

2. The device of claim 1, wherein the signal line wraps at least twice on the inner and outer circumferential surfaces of the core assembly.

3. A communication device for pipes of an air conditioner, the device comprising:
   a refrigerant pipe connecting an outdoor unit and an indoor unit to each other, the refrigerant pipe having an outer circumferential surface;

a core assembly having an annular sectional shape with a first side open end and a second side open end so as to surround the refrigerant pipe for coupling, wherein the core assembly has a core made of a magnetic material, and an inner circumferential surface of the core faces an outer circumferential surface of the refrigerant pipe; and a signal line configured to transfer electric signals transferred through the refrigerant pipe to an outdoor unit controller configured to control the outdoor unit and to an indoor unit controller configured to control the indoor unit, wherein the signal line extends along an inner circumferential surface of the core assembly and is electrically connected to the outdoor unit and indoor unit controllers, wherein the core assembly comprises a core holder formed of an insulating material and surrounding an outer circumferential surface of the core, the core holder comprising a signal line mounting hole formed therethrough along a lengthwise direction of the core holder, wherein the inner circumferential surface of the core assembly comprises the inner circumferential surface of the core and the core holder, wherein the core assembly comprises a pipe insertion recess that is defined by the inner circumferential surface of the core and the core holder;

wherein the signal line is disposed inside the signal line mounting hole and between the inner circumferential surface of the core assembly and the outer circumferential surface of the refrigerant pipe.

4. The device of claim 3, wherein an inner diameter of the pipe insertion recess is greater than an outer diameter of the refrigerant pipe.

* * * * *